May 28, 1940.   V. L. COX   2,202,730
SYSTEM OF ELECTRIC DISTRIBUTION
Filed Aug. 13, 1938
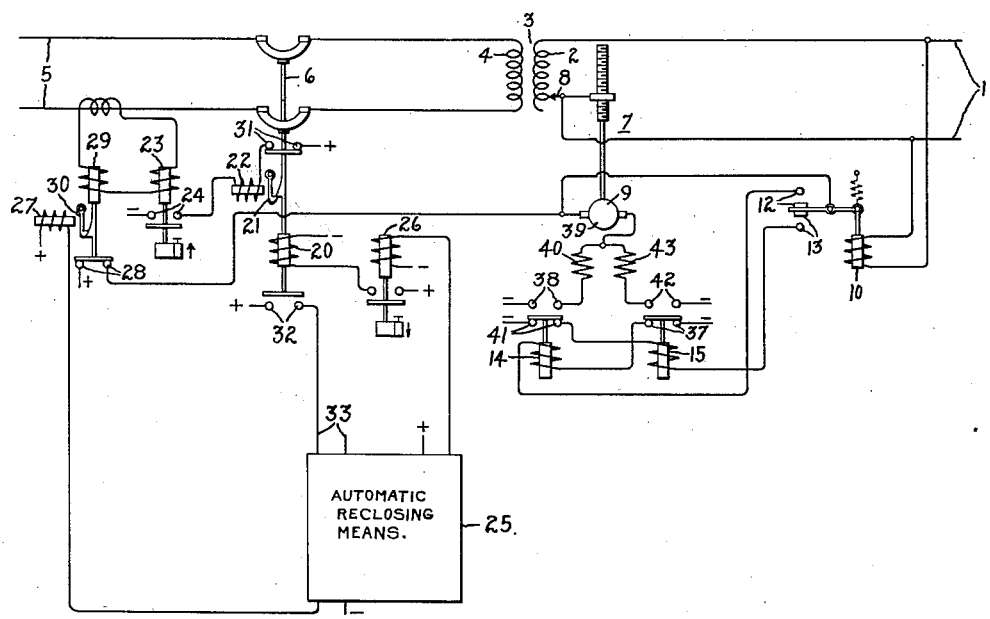
Inventor:
Vernon L. Cox,
by Harry C. Dunham
His Attorney.

Patented May 21, 1940

2,202,730

UNITED STATES PATENT OFFICE 2,202,730

SYSTEM OF ELECTRIC DISTRIBUTION

Vernon L. Cox, Upper Darby, Pa., assignor to General Electric Company, a corporation of New York Application August 13, 1938, Serial No. 224,754

6 Claims. (Cl. 171—119)

My invention relates to systems of electric distribution and particularly to such a system in which the connection between a supply circuit and a load circuit includes an automatically reclosed overload circuit breaker and a transformer which has associated therewith a tap-changing control mechanism for regulating the voltage applied to the load circuit.

One object of my invention is to provide in such a system of electric distribution an improved interlocking arrangement between the tap-changing control apparatus and the automatic reclosing means of the circuit breaker so as to insure that no tap-changing can occur under abnormal current conditions in the system.

My invention will be better understood from the following description when taken in connection with the accompanying drawing, the single figure of which illustrates a system of electric distribution embodying my invention, and its scope will be pointed out in the appended claims.

Referring to the drawing, I have shown a system of electric distribution comprising a load circuit 1 which is connected to the secondary winding 2 of a power transformer 3, the primary winding 4 of which is connected to a supply circuit 5 by means of a circuit breaker 6 which may be of any suitable type, examples of which are well-known in the art. In order to simplify the disclosure, I have shown single phase circuits 1 and 5, but it is obvious that it is applicable to circuits of any number of phases.

For varying the voltage applied to the load circuit 1, I have shown a tap-changing mechanism 7 having a movable contact 8 which is adapted to be moved, by means of a reversible motor 9, into engagement with a number of spaced taps of the secondary winding 2 of the transformer 3.

For controlling the reversible motor 9 automatically in response to an electrical condition of the load circuit 1, I have shown a contact-making voltmeter 10, the energizing winding of which is connected across the load circuit 1 in any suitable manner. The contact-making voltmeter 10 is provided with the contacts 12 which are closed when the voltage of circuit 1 is below a predetermined value and with the contacts 13 which are closed when the voltage of the circuit 1 is above a predetermined value. The contacts 12 control the circuit of a control relay 14 which, when energized, controls the circuit of the reversible motor 9 in any suitable manner so as to cause the contact 8 to be moved in the proper direction to increase the voltage applied to the load circuit 1. The contacts 13 control the circuit of a control relay 15 which, when energized, controls the circuit of the reversible motor 9 so that the contact 8 is moved in the proper direction to decrease the voltage applied to the load circuit 1. Preferably the tap-changing mechanism 7 is provided with suitable means, examples of which are well-known in the art, for insuring that, when the motor 9 is energized to effect a tap change, the motor remains energized until the tap-changing operation has been completed. However, in order to simplify the disclosure, such well-known details, to which my present invention does not relate, have been omitted from the drawing.

As shown in the drawing, the circuit breaker 6 is of the well-known latched-in type and is provided with a closing coil 20 which, when energized, closes the circuit breaker 6, a latch 21 for holding the circuit breaker in the closed position and a trip coil 22 which, when energized, releases the latch 21 to allow the circuit breaker 6 to open. For effecting the opening of the circuit breaker 6 when a fault occurs on the load circuit 1, I have shown a time delayed overcurrent relay 23 which is connected in series relation with the supply circuit 5 in any suitable manner so that the relay 23 closes its contacts 24 in response to a predetermined abnormal current flow through the supply circuit 5. The closing of the contacts 24 of the overcurrent relay 23 completes an energizing circuit for the trip coil 22 when the circuit breaker 6 is closed. It will be obvious to those skilled in the art that any other suitable fault responsive means may be provided for effecting the opening of the circuit breaker 6.

For effecting the reclosing of the circuit breaker 6 I provide the automatic reclosing means 25 which may be of any suitable type, examples of which are well-known in the art. For the purpose of this disclosure I have assumed that the automatic reclosing means is arranged to reclose the circuit breaker 6 a predetermined number of times and to lock it out if it fails to remain closed after being reclosed a predetermined number of times within a predetermined time interval. Since such automatic reclosing means are well-known in the art, and the detailed circuits thereof form no part of my present invention, I have represented such reclosing means by a rectangle. U. S. Letters Patent 1,784,651, granted December 9, 1930, and assigned to the same assignee as this application, discloses the details of an automatic reclosing arrangement which may be used in connection with my present invention to effect a predetermined number of successive energizations of a control relay 26 for the closing coil 20 with predetermined time intervals between successive energizations if the circuit breaker opens a predetermined number of times within a predetermined time interval and for effecting the energization of an associated magnet 27 if the circuit breaker 6 is closed after the reclosing means 25 has been in operation for a predetermined time.

In order to prevent the tap-changing mechanism 7 from being operated while the automatic reclosing means 25 is in operation to effect the reclosure of the circuit breaker 6, I provide in accordance with my invention an improved arrangement for rendering the tap-changing means 7 inoperative while the automatic reclosing means 25 is in operation. In the particular embodiment of my invention shown in the drawing, this result is obtained by having the operating circuits of the tap-changing mechanism 7 include the normally closed contacts 28 of a quick acting overcurrent relay 29 which is connected in series relation with the supply circuit 5 in any suitable manner. The overcurrent relay 29 is preferably arranged in any suitable manner so that it remains in its energized position after the operating winding thereof is deenergized. In the particular arrangement shown, this result is obtained by means of a latch 30 which holds the relay in its operated position and which is arranged to be released by the magnet 27 when it is energized in response to the operation of the automatic reclosing means 25.

The operation of the arrangement shown in the drawing is as follows:

When the circuit breaker 6 is closed and the load connected to the circuit 1 is such that sufficient current does not flow through the windings of the overcurrent relays 23 and 29 to cause them to operate, the voltage of the load circuit 1 is maintained at a substantially constant value by the tap-changing means 7. When the voltage of the load circuit 1 decreases below a predetermined value, the contact-making voltmeter 10 closes its contacts 12 and completes an energizing circuit for the control relay 14 through contacts 37 of relay 15, contacts 12 of voltmeter 10 and contacts 28 of relay 29. Relay 14 by closing its contacts 38 completes through contacts 28 of relay 29 an energizing circuit for the armature winding 39 and field winding 40 of motor 9 so that the contact 8 of the tap-changing arrangement 7 is moved in the proper direction to engage a higher voltage tap of the secondary winding 2 of the transformer 3.

When the voltage of the load circuit 1 increases above a predetermined value, the contact-making voltmeter 10 closes its contacts 13 and completes an energizing circuit for the control relay 15 through contacts 41 of relay 14, contacts 13 of voltmeter 10 and contacts 28 of relay 29. Relay 15 by closing its contacts 42 completes through contacts 28 of relay 29 an energizing circuit for the armature winding 39 and field winding 43 of the motor 9 so that the contact 8 of the tap-changing arrangement 7 is moved in the proper direction to engage a lower voltage tap of the secondary winding 2 of the transformer 3.

When an overload occurs on the load circuit 1, sufficient current flows through the windings of the overcurrent relays 23 and 29 to effect the immediate opening of contacts 28 and the closing of the contacts 24 after a predetermined time delay. As long as the contacts 28 remain open, the control circuits for the tap-changing mechanism 7 are open. The closing of the contacts 24 of overcurrent relay 23 completes an energizing circuit for the trip coil 22 through the auxiliary contacts 31 of the circuit breaker 6 to release the latch 21 so that the circuit breaker 6 opens. The closing of the auxiliary contacts 32 of the circuit breaker 6 in response to the opening thereof completes a starting circuit 33 for the automatic reclosing means 25. The automatic reclosing means then operates in a manner well-known in the art to reclose the circuit breaker 6 a predetermined number of times within a predetermined time interval with predetermined time intervals between successive reclosures. If the circuit breaker 6 is open at the expiration of a predetermined time interval after the initial opening of the circuit breaker, the automatic reclosing means 25 is rendered inoperative in a manner well-known in the art to effect further reclosures of the circuit breaker 6. If, however, the circuit breaker 6 is closed at the expiration of this predetermined time interval, the automatic reclosing means 25 effects the energization of the release magnet 27 to restore the locked out overcurrent relay 29 to its normal position. The closing of the contacts 28 of the overcurrent relay 29 then renders the tap-changing mechanism 7 operative to control the voltage of the load circuit 1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a system of electric distribution including a transformer having a winding with a plurality of taps, tap-changing mechanism for changing the connections to said taps, a circuit breaker controlling the current in said transformer winding, fault responsive means connected to said system for effecting the opening of said circuit breaker, and means for automatically reclosing said circuit breaker when it is open, a control arrangement for said tap-changing mechanism including means responsive to a predetermined electrical condition of said system for controlling the operation of said tap-changing mechanism, and means including fault responsive means connected to said system and having a shorter operating time than said first mentioned fault responsive means for rendering said tap-changing mechanism inoperative until said circuit breaker has been reclosed by said automatic reclosing means.

2. In a system of electric distribution including a transformer having a winding with a plurality of taps, tap-changing mechanism for changing the connections to said taps, a circuit breaker controlling the current in said transformer winding, fault responsive means connected to said system for effecting the opening of said circuit breaker, and means for automatically reclosing said circuit breaker when it is open, a control arrangement for said tap-changing mechanism including means responsive to a predetermined electrical condition of said system for controlling the operation of said tap-changing mechanism, and means including an overcurrent relay connected to said system and having a shorter operating time than said fault responsive means for rendering said tap-changing mechanism inoperative until said circuit breaker has been reclosed by said automatic reclosing means.

3. In a system of electric distribution including a transformer having a winding with a plurality of taps, tap-changing mechanism for changing the connections to said taps, a circuit breaker controlling the current in said transformer winding, fault responsive means connected to said system for effecting the opening of said circuit breaker, and means for reclosing said circuit breaker when it is open, a control arrangement for said tap-changing mechanism including means responsive to a predetermined electrical condition of said system for controlling the operation of said tap-changing mechanism, an overcurrent relay connected to said system and having a shorter operating time than said fault responsive means, holding means for maintaining said over-current relay in its operated position independently of the current in said system, means controlled by said reclosing means for releasing said holding means, and means responsive to the operation of said over-current relay for rendering said tap-changing mechanism inoperative.

4. In a system of electric distribution including an electric circuit, a transformer connected to said circuit and having a winding provided with a plurality of taps, tap-changing mechanism for changing the connections to said taps, a circuit breaker in said circuit, a time delayed overcurrent relay connected to said circuit for effecting the opening of said circuit breaker, and automatic reclosing means operative in response to the opening of said circuit breaker for effecting the reclosure of said circuit breaker a predetermined number of times, a control arrangement for said tap-changing mechanism including a control circuit, means responsive to the energization of said control circuit for effecting the operation of said tap-changing mechanism, means responsive to a predetermined electrical condition of said system for varying the energization of said control circuit, and a quick acting over-current relay connected to said electric circuit and having normally closed contacts in said control circuit.

5. In a system of electric distribution including an electric circuit, a transformer connected to said circuit and having a winding provided with a plurality of taps, tap-changing mechanism for changing the connections to said taps, a circuit breaker in said circuit, a time delayed overcurrent relay connected to said circuit for effecting the opening of said circuit breaker, and automatic reclosing means operative in response to the opening of said circuit breaker for effecting the reclosure of said circuit breaker a predetermined number of times, a control arrangement for said tap-changing mechanism including a control circuit, means responsive to the energization of said control circuit for effecting the operation of said tap-changing mechanism, means responsive to a predetermined electrical condition of said system for varying the energization of said control circuit, a quick acting overcurrent relay connected to said electric circuit and having normally closed contacts in said control circuit, and means for maintaining said normally closed contacts open while said automatic reclosing means is in operation.

6. In a system of electric distribution including an electric circuit, a transformer connected to said circuit and having a winding provided with a plurality of taps, tap-changing mechanism for changing the connections to said taps, a circuit breaker in said circuit, a time delayed overcurrent relay connected to said circuit for effecting the opening of said circuit breaker, and automatic reclosing means operative in response to the opening of said circuit breaker for effecting the reclosure of said circuit breaker a predetermined number of times, a control arrangement for said tap-changing mechanism including a control circuit, means responsive to the energization of said control circuit for effecting the operation of said tap-changing mechanism, means responsive to a predetermined electrical condition of said system for varying the energization of said control circuit, a quick acting overcurrent relay connected to said electric circuit and having normally closed contacts in said control circuit, locking means for maintaining said contacts open, and means controlled by said automatic reclosing means for rendering said locking means inoperative after a predetermined time interval.

VERNON L. COX.